United States Patent [19]

Reece

[11] 4,182,260
[45] Jan. 8, 1980

[54] HAND BREADER

[76] Inventor: Vernon E. Reece, 1936 W. 47th Pl., Tulsa, Okla. 74125

[21] Appl. No.: 867,756

[22] Filed: Jan. 9, 1978

[51] Int. Cl.² .............................................. B05C 3/02
[52] U.S. Cl. ...................................... 118/26; 118/22; 118/610; 209/302
[58] Field of Search ................... 118/16, 22, 26, 603, 118/610; 209/301, 302, 303, 341, 352, 397, 374, 405, 408; 222/161, 565; 239/689

[56] References Cited

U.S. PATENT DOCUMENTS

| 583,994 | 6/1897 | Haase | 209/405 |
|---|---|---|---|
| 731,895 | 6/1903 | Hancock | 209/408 X |
| 1,030,673 | 6/1912 | McIlvaine | 209/405 |
| 3,029,946 | 4/1962 | Wright, Jr. et al. | 209/405 |
| 3,910,227 | 10/1975 | Reece | 118/29 |

Primary Examiner—John P. McIntosh
Attorney, Agent, or Firm—Head & Johnson

[57] ABSTRACT

A breading apparatus including a table structure, an open top breading pan supported on the table structure, the pan having a central opening in the bottom with a removable closure so that flour or the like may be deposited in the pan and pieces of foods, such as chicken, may be placed in the flour and by manual manipulation the pieces of food are covered with flour, a removable catch pan supported by the table structure below the breading pan, and a sifter apparatus supported by the table structure between the breading pan and the catch pan, the sifter apparatus including an upright basket holder supported on the table structure and rotatable about a vertical axis, a motor supported by the table structure, a crank arm rotated by the motor, a connecting rod extending between the crank arm and the basket holder so that when the motor is energized the basket holder is reciprocated about its vertical axis, and an open top cylindrical sifter having foraminous cylindrical sidewalls and a removable foraminous bottom, the sifter being removably supported on the basket holder and reciprocated about its cylindrical axis by the base member so that flour discharged from the breading pan falls into the sifter and the sifted flour falls from the sifter into the catch pan, the sifter intercepting pieces of dough or other material.

4 Claims, 6 Drawing Figures

HAND BREADER

BACKGROUND AND OBJECTS OF THE INVENTION

Some food is prepared by first cutting the food into pieces, dipping the pieces in a batter, and then breading the pieces by placing them in a container of flour and by manual manipulation all surfaces of the battered pieces are covered with the flour. The pieces having the batter and flour thereon are cooked, usually by deep frying.

In the process of manipulating the pieces of food covered with batter in the flour, some mixture of the batter and flour becomes dislodged from the pieces of food to take the form of pastry dough. The flour can be reused, however, the dough or other extraneous material must be separated from the flour. The present invention is directed toward an apparatus for facilitating the breading of pieces of food and the handling of the flour, that is, sifting the flour to remove dough and extraneous materials so that the flour may be reused.

U.S. Pat. No. 3,910,227 issued Oct. 7, 1975 entitled "Hand Breader" shows an apparatus which accomplishes the same results of the present invention and in much the same way. The present invention is directed towards an improvement in the breader apparatus of this prior issued patent and particularly an improvement in the sifter as employed in the hand breader apparatus.

It is therefore an object of this invention to provide an improved hand breader for pieces of food.

More particularly, an object of this invention is to provide an improved sifter mechanism for sifting flour to remove dough and other extraneous material, the improved sifter mechanism being characterized by improved speed and efficiency of sifting.

SUMMARY OF THE INVENTION

The present invention is directed towards an apparatus for use in breading pieces of food and is specifically and primarily intended to be used for breading pieces of food to be deep fried, such as fried chicken. A most common means of preparing fried chicken is to first cut the prepared chicken into pieces. These pieces are then dipped into a batter made up of a number of ingredients but usually including eggs. The batter leaves the pieces of chicken with a liquid coating. The coated pieces are then breaded, that is, dipped into flour which may also contain other ingredients to give the prepared chicken selected flavor.

One of the problems encountered in breading pieces of chicken having batter thereon is that in the process a part of the batter combines with flour to form a dough, and all of the dough does not adhere to the pieces of chicken when they are removed from the flour. This dough remains in the flour, and after the breading operation has taken place for a while, the flour becomes contaminated with the dough to the point where breading is not expeditiously and completely accomplished. For this reason it is necessary to periodically sift the flour to remove dough and other extraneous materials so that the flour may be reused.

U.S. Pat. No. 3,910,227, previously referred to, describes a hand breader apparatus which accomplishes the objective of providing a means whereby pieces of food, such as chicken, may be easily breaded. This patent discloses a sifting mechanism used with the hand breader in which a sifter having a perforated bottom is oscillated about the cylindrical axis of the sifter to cause flour to pass through the perforated bottom. Dough and other extraneous material remain in the sifter for disposal.

The present invention is directed towards an improvement in the sifter, the improvement including an arrangement of the sifter having foraminous cylindrical sidewalls and a foraminous removable bottom portion. The perforated or foraminous sidewalls result in greatly increased speed and efficiency of sifting of flour since the sifted flour may pass outwardly both through the bottom and through the sifter sidewalls. In addition, the removable bottom of the sifter provides an arrangement wherein the sifter may be disassembled for thorough, easy, and complete cleaning.

DESCRIPTION OF THE VIEWS

DETAILED DESCRIPTION OF THE PREFERRED EMBODIMENT

Figure 1:
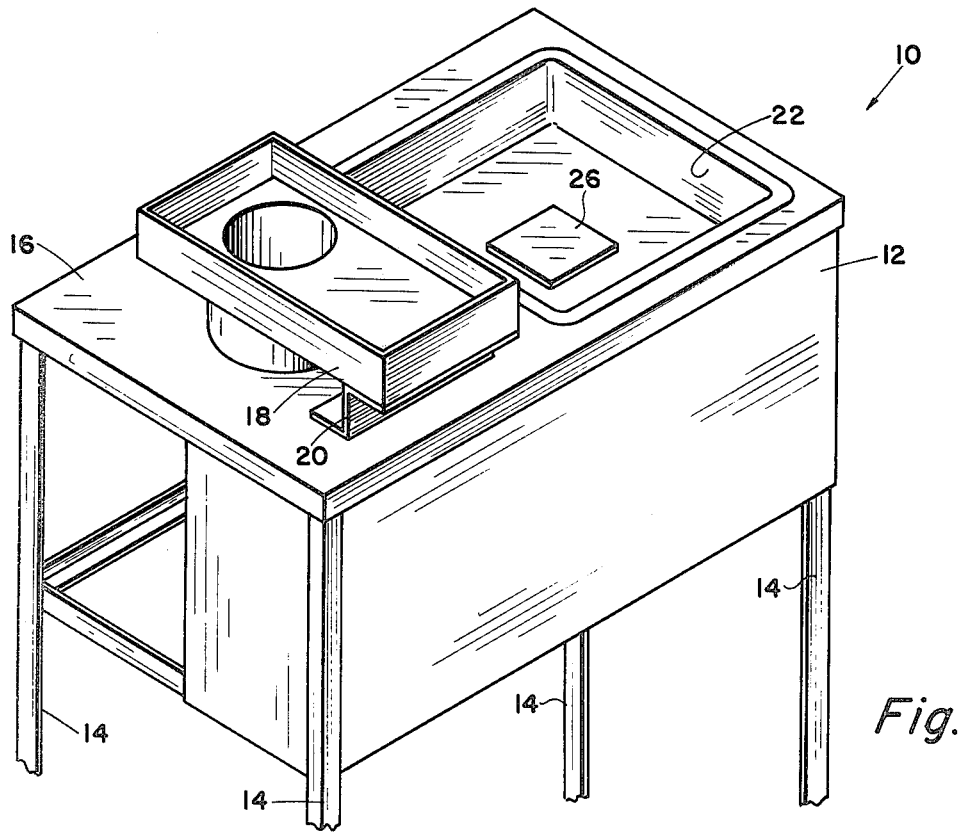
FIG. 1 is a partial isometric view of a hand breading apparatus which may employ this invention, the apparatus being of the type used for breading pieces of chicken prior to cooking the chicken.

FIG. 1 illustrates a hand breader which may employ the invention. The numeral 10 indicates the hand breader apparatus comprising a support structure 12 with a plurality of vertically disposed spaced legs 14. A flat tabletop 16 provides a working surface of convenient height. A drip tray 18 is positioned on the upper surface 16 supported by bracket 20.

Received in an opening in tabletop 16 is a removable flour pan 22 which has an opening 24 in the bottom thereof. The opening may normally be covered by closure 26 as shown in FIG. 1 so that flour placed in the pan 22 remains there until the user desires to move the flour out of the pan.

When the apparatus of FIG. 1 is used to bread chicken or the like, a liquid batter is placed in drip tray 18. Pieces of chicken having batter thereon are placed in drip tray 18 so that excess batter may drain off. The pieces of chicken covered with the liquid batter are next moved by hand into flour pan 22 which is substantially filled with flour. By "flour" is meant a breading mixture which is made up according of the recipe of the user. Most breading mixtures are composed essentially of flour with the addition of salt and spices or other flavor adding ingredients.

By manual manipulation the pieces are tumbled about in the flour until they are completely covered. The pieces are then ready to be removed and deep fried or cooked in some other way. Liquid batter causes the formation of dough when it mixes with the flour, and while most of this adheres to the pieces of chicken, some dislodges and remains in the flour pan in the form of dough or dough balls. When dough collects to a certain extent it interferes with the breading operations and the flour must be removed from pan 22 and the dough sifted therefrom in order for the flour to be reused.

Figure 2:
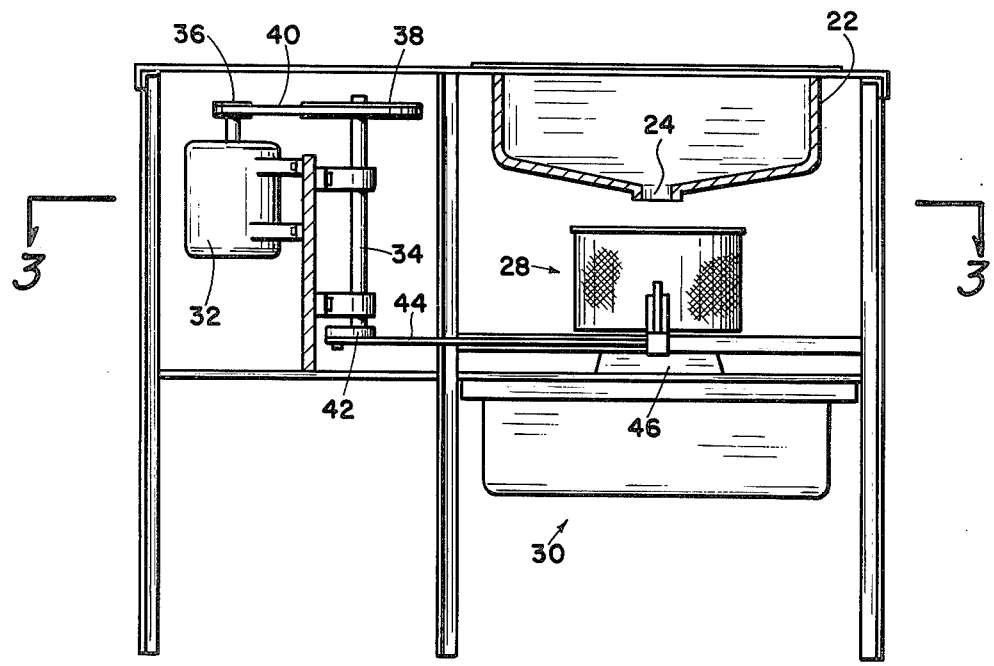
FIG. 2 is an elevational cross-sectional view of the hand breader of FIG. 1.

To remove the flour, the cover 26 is removed so the flour passes out through opening 24 (see FIG. 2) into a sifter basket generally indicated by the numeral 28. Mounted below the sifter basket 28 is a catch pan 30 which receives the flour passing from the sifter basket. Dough and other extraneous material is retained in the sifter basket for disposal.

In order to actuate the sifter basket 28 a motor 32 drives a shaft 34 by means of pulleys 36 and and 38 and belt 40. On the lower end of shaft 34 is a crank arm 42. A connecting rod 44 has one end rotatably connected to the crank arm so that when motor 32 is energized connecting rod 44 is reciprocated.

Figure 3:
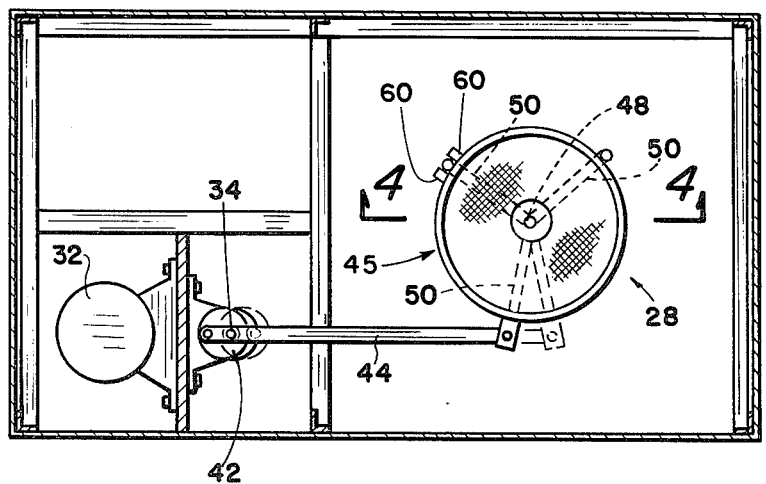
FIG. 3 is a cross-sectional plan view taken along the line 3—3 of FIG. 2 showing the sifting mechanism of the hand breader.

A basket holder, generally indicated by the numeral 45, is rotatably supported on base 46. The basket holder includes a rotatable shaft 48 (see FIG. 3) extending uprightly from base 46 with three arms 50 extending outwardly from the shaft. Each arm 50 is bent upwardly at its outer end so that sifter 28 is removably supported on the arms. The outer end of connecting rod 44 is connected to one of the arms 50 so that the basket holder 45 is rotatably reciprocated by means of motor 32.

Figure 4:
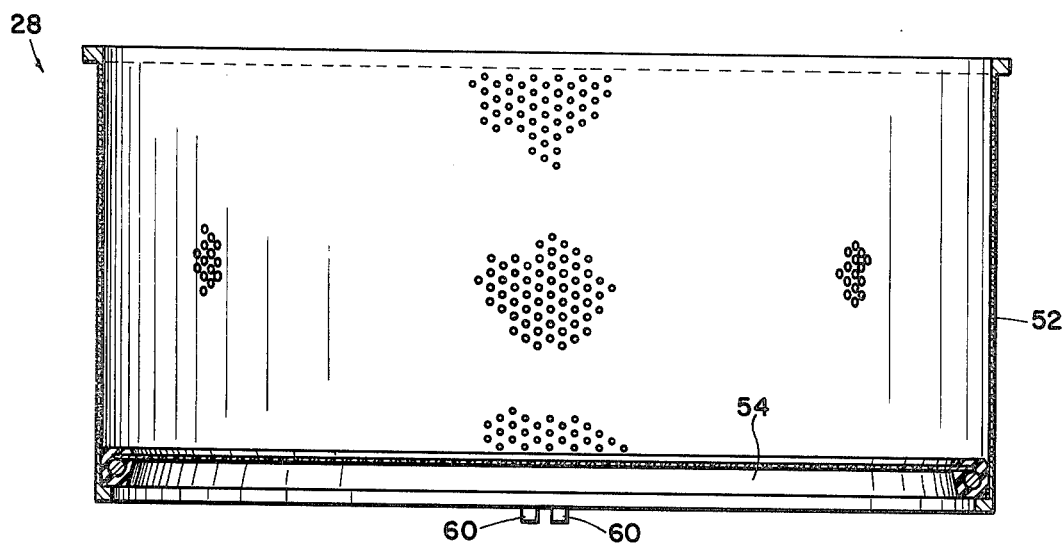
FIG. 4 is an enlarged cross-sectional view of the sifter basket as taken along the line 4—4 of FIG. 3.
Figure 5:
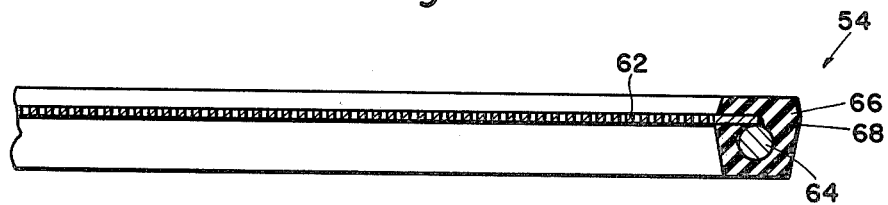
FIG. 5 is an enlarged cross-sectional segmented view of the sifter basket bottom.
Figure 6:
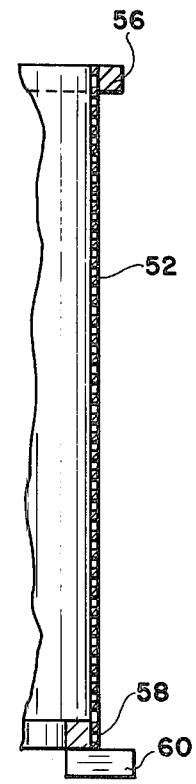
FIG. 6 is an enlarged side view of the cylindrical sifter basket showing the details of one method of constructing the sifter basket.

Referring to FIGS. 4, 5, and 6, the details of the sifter basket are better illustrated. The sifter basket 28 is in the form of an open top cylindrical vessel having foraminous sidewalls 52 and a removable foraminous bottom 54. The sidewalls 52 are formed of perforated metal, preferably stainless steel, with the size of the perforations being preselected according to the material being sifted and the maximum particle size which can be tolerated in the sifted product. It can be seen, however, that the basket sidewalls 52 may be made of screen wire or woven material, however, the use of a perforated sheet material is preferred because of its better structural strength and the fact that it is easily cleaned and sanitized since it does not include crevices as does woven material.

As shown in FIG. 6, the sidewall 52 has a metal circular top flange 56 on the upper exterior surface of sidewall 52, affixed such as by welding. A similarly circular metal flange 58 is at the bottom and secured to the interior surface of the sidewalls 52, such as by welding. The only other elements of the basket sidewall are two spaced apart prongs 60 (see FIGS. 3, 4, and 6) formed of short lengths of metal which are welded to the bottom band 58 and slightly spaced from each other. The width of the space between the prongs 60 is such as to receive the upturned ends of one of the rod 50 so as to rotatably interlock basket 28 with the basket support.

The sifter basket bottom 54 is preferably formed of a foraminous or perforated plate 62 of flat, circular shape. As with the basket sidewalls 52, the bottom plate 62 may be of woven material, however, it is preferably of a perforated planar sheet because of increased ease of cleaning and sanitization. Welded around the circumference of the bottom plate 62 is a continuous metal band 64. The preferred arrangement also includes a molded elastomeric member 66 (see FIGS. 4 and 5). The elastomeric member is configured such that the external cylindrical surface is snugly but removably received by the interior of the basket cylindrical sidewalls 52. To insure close contact fit so as to prevent passage of flour from the basket downwardly past the exterior of elastomeric member 66, the outward sidewalls are sloped as illustrated to a circumferential contact 68. When the sifter bottom 54 is placed within the sifter basket, the circumferential contact 68 is slightly compressed to insure a snug, close fit and to insure that the bottom 54 is reciprocated as the basket is reciprocated, but nevertheless permitting the bottom to be easily removed for cleaning.

When flour in flour pan 22 has been contaminated with dough and other materials so as to impair its effective usage for breading, the user removes the closure 26 and allows the flour to pass downwardly through opening 24. Before permitting the passage of flour, motor 32 is energized so that the sifter 28 is reciprocated. Flour passes out of the opening 24 and falls into the basket, and the reciprocal agitation of the sifter basket 28 about its vertical cylindrical axis causes the flour to pass through the openings in both the bottom 54 and sidewalls 52. Other sifters, such as shown in U.S. Pat. No. 3,910,227 previously referred to, pass the flour through a foraminous bottom. However, it has been discovered that providing the foraminous sidewalls 52 greatly increases the efficiency and speed of sifting. The reciprocation of the basket forces flour against the sidewalls 52 by centrifugal force and a substantial portion of the sifted flour passes outwardly through the sidewall so that with a given size of sifter basket, the provision of the perforated sidewalls greatly increases the sifting rate. This means that the user can more expeditiously cause the flour in pan 22 to be moved through opening 24 without concern that the sifter will be overtaxed. The sifted flour falls into catch pan 30. The pan may then be removed and the flour placed back into flour pan 22 for further use. After the sifting operation basket 28 may be removed from basket holder 45 so as to disposed of dough and other material which has been captured by the sifter. Since the sifter basket merely sits on the basket holder 45 it can expeditiously be removed and replaced.

When it is time to clean the sifter the bottom 54 is easily removed. By the arrangement of the structure illustrated there are no crevices in which food contamination can occur. Thus both the basket sidewall portion 52 and bottom portion 54 can easily be thoroughly cleaned and sanitized without fear that any food particles can be trapped and without any area for bacteria to grow and multiply.

Thus the invention described herein provides an improved sifter mechanism having an improved rate of sifting with a given size vessel and in an arrangement providing better sanitation.

While the invention has been described with a certain degree of particularity it is manifest that many changes may be made in the details of construction and arrangement of components without departing from the spirit and scope of this disclosure. It is understood that the invention is not limited to the embodiment set forth herein for purposes of exemplification but is to be limited only by the scope of the attached claim or claims, including the full range of equivalency to which each element thereof is entitled.

What is claimed is:

1. A breading apparatus comprising:
a table structure;
an open top breading pan supported on said table, the breading pan being open at the top and having a central closable opening in the bottom thereof, the breading pan being adaptable to receive flour or like material wherein pieces of food, such as pieces of chicken, may be placed in the flour and covered with the flour by manual manipulation of the process in the flour;

a removable catch pan supported by the table below said breading pan;

and a sifting apparatus supported by the said table structure between said breading pan and said catch pan comprising:

an upright reciprocal basket holder supported by said table and rotatable about a vertical axis in substantial vertical alignment with said bottom opening in said breading pan;

a motor supported by said table structure;

a crank arm rotated by said motor;

means connecting said crank arm to said reciprocal basket holder whereby when the motor is energized the basket holder is reciprocated about its vertical axis;

an open top cylindrical sifter having foraminous vertical sidewalls substantially perpendicular to a removable flat foraminous bottom;

said sidewalls formed of continuous foraminous material; the sidewalls having a reduced diameter interior flange therein, the flange receiving and supporting said foraminous bottom; the bottom being a circular flat plate of an exterior diameter substantially equal to the interior diameter of the cylindrical vessel and of diameter larger than the internal diameter of said interior flange;

a molded elastomeric member encompassing the outer circumferential area of the bottom plate, the outside diameter of the elastomeric member being of a dimension to be slidably received in said vessel cylindrical sidewalls; said outside diameter having an outer circumferential contact portion to provide a snug fit between said sidewalls and said bottom;

said sifter being removably supported on said basket holder and reciprocated about its cylindrical axis by said basket holder whereby flour or the like discharged from said breading pan falls into said sifter and the sifted flour falls from said sifter into said catch pan.

2. A breading apparatus according to claim 1 wherein said bottom plate is provided with a metal ring secured to the plate at the circumference thereof, and said molded elastomeric member encompasses the outer circumferential area of the plate and the metal ring.

3. An improved apparatus for sifting flour and the like, comprising:

an open top cylindrical vessel formed of continuous foraminous upright sidewalls having a reduced diameter interior flange therein, the flange receiving and supporting a foraminous bottom, the bottom being formed of a circular flat plate of foraminous material having an exterior diameter substantially equal to the interior diameter of the cylindrical vessel and of diameter larger than the internal diameter of said interior flange;

a molded elastomeric member encompassing the outer circumferential area of the plate, the outside diameter of the elastomeric member being of a dimension to be slidably received in said vessel cylindrical sidewalls;

said outside diameter having an outer circumferential contact portion to provide a snug fit between said sidewalls and said bottom; and means for supporting the vessel uprightly and oscillating the vessel rotatably around the cylindrical axis.

4. An improved apparatus for sifting flour and the like according to claim 3 wherein said bottom plate has a metal ring secured at the circumference thereof, and said molded elastomeric member encompasses the outer circumferential area of the plate and metal ring.

* * * * *